(12) United States Patent
Panahpour Tehrani et al.

(10) Patent No.: US 8,687,000 B2
(45) Date of Patent: Apr. 1, 2014

(54) IMAGE GENERATING APPARATUS AND COMPUTER PROGRAM

(75) Inventors: Mehrdad Panahpour Tehrani, Saitama (JP); Akio Ishikawa, Saitama (JP)

(73) Assignee: KDDI Corporation, Tokyo (JP)

( * ) Notice: Subject to any disclaimer, the term of this patent is extended or adjusted under 35 U.S.C. 154(b) by 452 days.

(21) Appl. No.: 12/718,431

(22) Filed: Mar. 5, 2010

(65) Prior Publication Data

US 2010/0253682 A1    Oct. 7, 2010

(30) Foreign Application Priority Data

Apr. 3, 2009   (JP) .................... 2009-090660

(51) Int. Cl.
| | |
|---|---|
| G06T 15/00 | (2011.01) |
| G06T 15/40 | (2011.01) |
| G09G 5/00 | (2006.01) |
| G06K 9/00 | (2006.01) |
| H04N 13/00 | (2006.01) |
| H04N 13/02 | (2006.01) |

(52) U.S. Cl.
USPC ........... 345/422; 345/419; 345/421; 345/632; 382/154; 348/43; 348/47; 348/48

(58) Field of Classification Search
USPC .......... 345/418–428, 429, 629–634; 715/757; 382/154, 285; 463/31–33, 34; 348/43, 348/47, 48
See application file for complete search history.

(56) References Cited

U.S. PATENT DOCUMENTS

| | | | |
|---|---|---|---|
| 6,445,807 B1 * | 9/2002 | Katayama et al. ............ 382/100 |
| 6,608,622 B1 * | 8/2003 | Katayama et al. ............ 345/419 |
| 6,636,234 B2 * | 10/2003 | Endo et al. .................... 345/646 |
| 6,674,922 B1 * | 1/2004 | Kotake et al. ................. 382/300 |
| 6,791,540 B1 * | 9/2004 | Baumberg ..................... 345/419 |
| 6,906,708 B1 * | 6/2005 | Katayama ..................... 345/419 |
| 7,085,409 B2 * | 8/2006 | Sawhney et al. ............. 382/154 |
| 7,286,143 B2 * | 10/2007 | Kang et al. .................... 345/629 |
| 7,379,583 B2 * | 5/2008 | Zitnick et al. ................ 382/154 |
| 7,657,055 B2 * | 2/2010 | Katayama et al. ............ 382/100 |
| 8,106,924 B2 * | 1/2012 | Aliprandi et al. ............ 345/629 |
| 2007/0122027 A1 * | 5/2007 | Kunita et al. ................ 382/154 |

(Continued)

FOREIGN PATENT DOCUMENTS

| | | |
|---|---|---|
| JP | A-2001-67473 | 3/2001 |
| JP | A-2008-15756 | 1/2008 |
| JP | A-2008-263528 | 10/2008 |

OTHER PUBLICATIONS

Toshiaki Fujii and Masayuki Tanimoto, Free-Viewpoint TV System Based on Ray-Space Representation 2002, Proceedings of SPIE, vol. 4864 (2002), pp. 175-189.*

(Continued)

*Primary Examiner* — Xiao M. Wu
*Assistant Examiner* — Michael J Cobb
(74) *Attorney, Agent, or Firm* — Oliff PLC (57) ABSTRACT

The present invention relates to an image generating apparatus for generating an image from a viewpoint specified by a user. According to the invention, the apparatus has a storage unit that stores a plurality of pre-images from viewpoints on predetermined lines and depth maps indicating a depth value of each pixel of a corresponding pre-image, and an image generating unit that generates a first image from a first viewpoint based on the pre-images and depth maps.

10 Claims, 5 Drawing Sheets

(56) References Cited

U.S. PATENT DOCUMENTS

| | | | |
|---|---|---|---|
| 2009/0033740 A1* | 2/2009 | Ishikawa et al. | 348/39 |
| 2009/0304264 A1* | 12/2009 | Au et al. | 382/154 |
| 2011/0148858 A1* | 6/2011 | Ni et al. | 345/419 |
| 2011/0157229 A1* | 6/2011 | Ni et al. | 345/646 |
| 2013/0249904 A1* | 9/2013 | Kobayashi et al. | 345/419 |

OTHER PUBLICATIONS

Norishige Fukushima, Tomohiro Yendo, Toshiaki Fuji and Masayuki Tanimoto Free Viewpoint Image Generation Using Multi-Pass Dynamic Programming 2007, Proceedings of SPIE, vol. 6490, pp. 64901F-1 to 65901F-11.*

Norishige Fukushima, Tomohiro Yendo, Toshiaki Fuji and Masayuki Tanimoto Real-time Arbitrary View Interpolation and Rendering System using Ray-Space 2005, Proceedings of SPIE, vol. 6016, pp. 60160Q-1 to 60160Q-12.*

Kiyohide Satoh, Itaru Kitahara, Yuichi Ohta 3D Image Display with Motion Parallax by Camera Matrix Stereo 1996, Proceedings of Multimedia, pp. 349-357.*

Chris Buehler, Michael Bosse, Leonard McMillan, Steven Gortler, Michael Cohen Unstructured Lumigraph Rendering 2001, SIGGRAPH Conference Proceedings, 425-432.*

Steven Seitz Image-Based Transformation of Viewpoint and Scene Appearance 1997, Doctoral dissertation, University of Wisconsin at Madison.*

Leonard McMillan an Image-Based Approach to Three-Dimensional Computer Graphics 1997, Doctoral dissertation, University of North Carolina at Chapel Hill, Chapter 3.*

Shenchang Eric Chen, Lance Williams, View Interpolation for Image Synthesis, 1993, Proceedings of the 20th annual conference on Computer graphics and interactive techniques SIGGRAPH '93, p. 279-288, ISBN:0-89791-601-8.*

Bastian Goldlucke, Multi-Camera Reconstruction and Rendering for Free-Viewpoint Video, 2006, Doctoral Thesis, Max- Planck-Institut fur Informatik.*

Neal Orman, Hansung Kim, Ryuuki Sakamoto, Tomoji Toriyama, Kiyoshi Kogure, Robert Lindeman, GPU-Based Optimization of a Free-Viewpoint Video System, 2008, Electronic Letters on Computer Vision and Image Analysis 7(2):120-133.*

Naemura, et al., "Ray-Based Creation of Photo-Realistic Virtual World," 1997, VSMM97, pp. 59-68, IEEE.

Droese, et al., "Ray-Space Interpolation based on Filtering in Disparity Domain." Proc. of 3D Image Conference, 2004, pp. 1-4.

Ishikawa et al., "About a Walk-Through Free Viewpoint Video Generation System", Image Lab, Japan Industrial Publishing Co., Ltd., Feb. 20, 2009, pp. 68-73, vol. 20, No. 2 (with Abstract).

Jan. 8, 2013 Office Action issued in Japanese Patent Application No. 2009-090660 (with translation).

* cited by examiner

IMAGE GENERATING APPARATUS AND COMPUTER PROGRAM

PRIORITY CLAIM

This application claims priority from Japanese patent application No. 2009-90660 filed on Apr. 3, 2009, which is incorporated herein by reference.

BACKGROUND OF THE INVENTION

1. Field of the Invention

The present invention relates to a free viewpoint video system.

2. Description of the Related Art

Various proposals has been made for generating a free viewpoint video from motion pictures captured by several cameras, for example, in Japanese patent publication 2008-15756A1, "Ray-Based Creation of Photo-Realistic Virtual World" by Takeshi Naemura, et al. (VSMM97, pp. 59-68) and "Ray-Space Interpolation based on Filtering in Disparity Domain" by Michael Droese, et al. (Proc. of 3D Image Conference 2004)

The method proposed in above documents is called image based rendering. More specifically, a ray-space is generated using a plurality of images captured by a plurality of cameras, and an image from an arbitrary viewpoint is generated by interpolation using each ray value in the ray-space.

SUMMARY OF THE INVENTION

In a free viewpoint video system, in response to input an arbitrary viewpoint from a user terminal such as a personal computer, a video signal from the viewpoint is generated and displayed on the user terminal. To realize such a free viewpoint video system, it is required to shorten the image generating time. If images of almost all viewpoints could be generated and stored in an image generating apparatus beforehand, the image generating time could be shorten enough. However, it is not realistic.

The invention has been made in view of the above-mentioned problem, and it is therefore an object of the present invention to provide an image generating apparatus, which generates images from an arbitrary viewpoint as quick as possible, as well as the computer program, which functions a computer as the apparatus.

According to the invention, an image generating apparatus includes a storage unit and an image generating unit. The storage unit is configured to store a plurality of pre-images from viewpoints on predetermined lines and depth maps, which indicate a depth value of each pixel of a corresponding pre-image. The image generating unit is configured to generate a first image from a first viewpoint based on the pre-images and depth maps.

Preferably, the image generating unit includes a viewpoint determination unit, a projective transformation unit and a pixel value determination unit. The viewpoint determination unit is configured to select a first line from the predetermined lines, and configured to determine a second viewpoint of a second image on the first line. Here, the second image has a second pixel caused or generated by the same ray as a first pixel of the first image. The projective transformation unit is configured to select a third image from pre-images on the first line, and configured to calculate a depth value of the second pixel from a depth map of the third image. The pixel value determination unit is configured to determine a third pixel of the third image corresponding to the second pixel based on the depth value of the second pixel and the depth map of the third image, and configured to determine a pixel value of the first pixel, which has the same pixel value as the second pixel, based on a pixel value of the third pixel.

According to an aspect of the invention, the projective transformation unit selects a fourth image from pre-images on the first line. Here, a viewpoint of the fourth image is located on an opposite side of a viewpoint of the third image with reference to the second viewpoint. Then, the pixel value determination unit determines a fourth pixel of the fourth image corresponding to the second pixel based on the depth value of the second pixel and a depth map of the fourth image, and uses a pixel value of the fourth pixel to determine the pixel value of the first pixel.

Advantageously, the image generating unit determines the pixel value of the first pixel using a pre-image on a line other than the first line when the depth value of the second pixel can not be obtained from the depth map of the third image.

Preferably, the image generating unit obtains the depth value of the second pixel from the depth map of the fourth image when the depth value of the second pixel can not be obtained from the depth map of the third image, and determines the pixel value of the first pixel using a pre-image on a line other than the first line when the depth value of the second pixel can not be obtained from the depth map of the fourth image.

Preferably, the first line is the closest line to the first viewpoint.

According to an aspect of the invention, the viewpoint determination unit is configured to determine a second viewpoint of a second image from each line. Here, the second image has a second pixel caused or generated by the same ray as a first pixel of the first image. The projective transformation unit is configured to select third images from pre-images, and configured to calculate a depths value of each second pixel from depth maps of the third images. Here, each third viewpoint of the third images being located next to each second view point on the same line. The pixel value determination unit is configured to determine a third pixel of each third images corresponding to each second pixel based on the depth value of each second pixel and depth maps of the third images, and configured to determine a pixel value of the first pixel from pixel values of third pixels.

According to the invention, a computer program functions a computer as the image generating apparatus, and a computer readable medium includes the computer program.

According to the invention, viewpoints are set on a plurality of straight lines and/or curbed lines, and pre-images from the viewpoints as well as their depth maps are stored in the storage unit in advance. With this configuration, the image generating unit can quickly generate an image from any viewpoint by determining pixels in pre-images representing the same point as a pixel in the image to be generated using depth maps. Further, an amount of data stored in the storage unit can be reduced to a realistic value.

Further objects and advantages of the present invention will be apparent from the following description of the preferred embodiments of the invention as illustrated in the accompanying drawings.

DETAILED DESCRIPTION OF THE INVENTION

A viewpoint is specified by a position and a direction, and "an image of a viewpoint" or "an image from a viewpoint" means an image within the predetermined visual field at the position and the direction specified by the viewpoint in the following description. Further, camera parameters of a camera can be considered as a viewpoint and a visual field, and an image captured by a camera is also referred to as an image of a viewpoint. In this case, a position of the viewpoint is a position of the camera, and a direction of the viewpoint is a direction of the camera.

Figure 1:
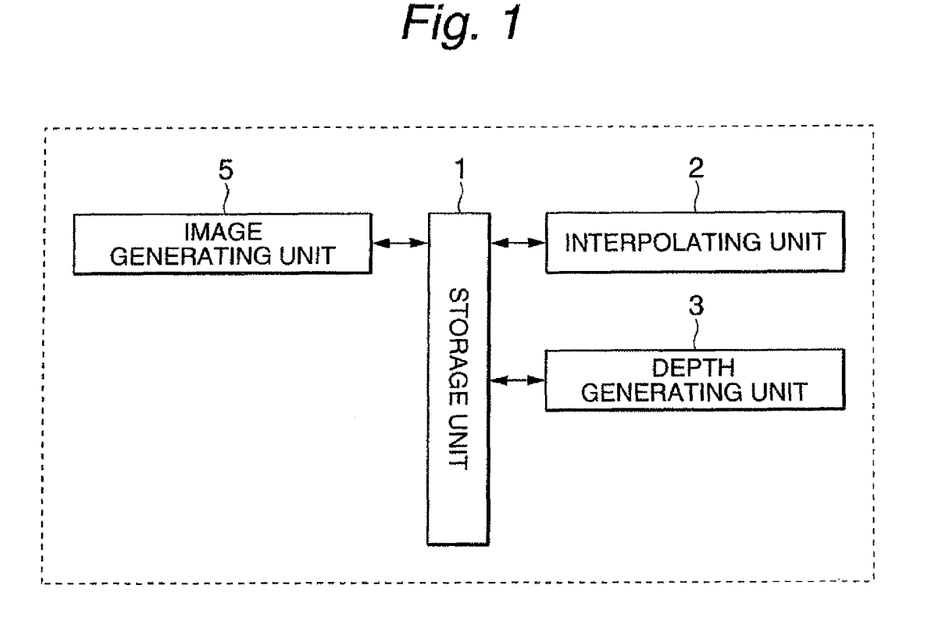
FIG. 1 shows a block diagram of an image generating apparatus according to the invention.

FIG. 1 shows a block diagram of an image generating apparatus according to the invention. As shown in FIG. 1, the image generation apparatus has a storage unit 1, an interpolating unit 2, a depth generating unit 3 and an image generating unit 5.

The interpolating unit 2 generates a plurality of new images of predetermined viewpoints from images in motion pictures captured by a plurality of cameras. The interpolating unit 2 uses interpolation technique based on camera parameters of the cameras to generate new images. Hereinafter, the term "captured image" refers to an image captured by a camera, the term "interpolated image" refers to an image generated at the interpolating unit 2 from captured images and/or interpolated images. Further, both "captured image" and "interpolated image" are referred to collectively as "pre-image." The interpolating unit 2 stores captured images and interpolated images to the storage unit 1.

Figure 3:
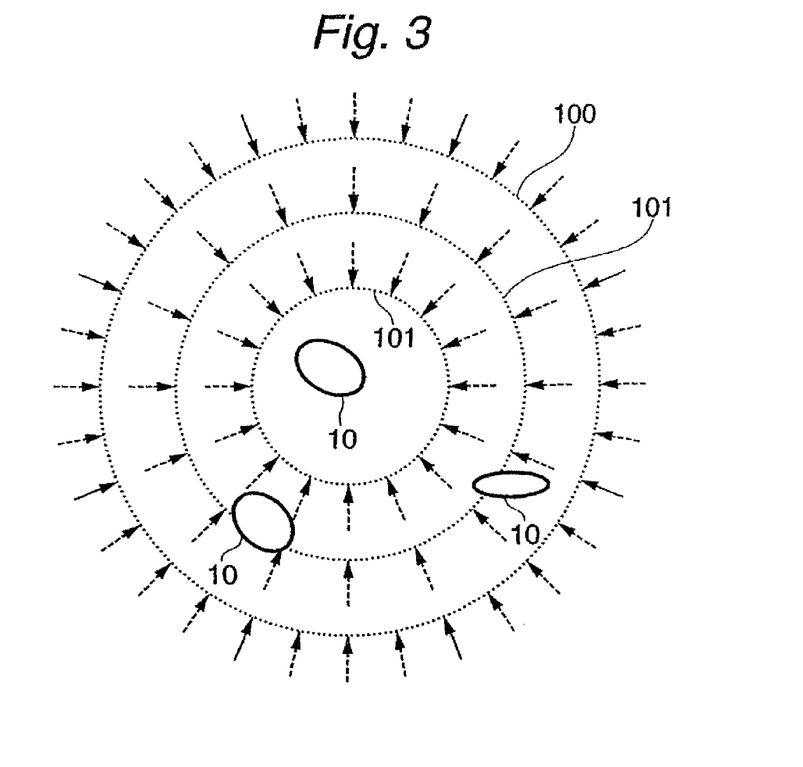
FIGS. 3 and 4 show viewpoints of pre-images.
Figure 4:
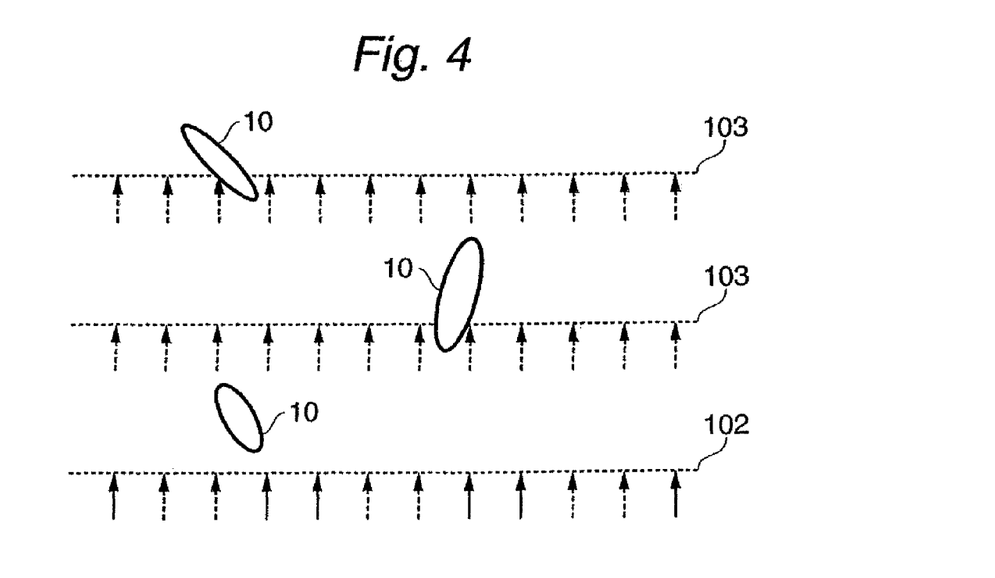

FIGS. 3 and 4 show viewpoints of pre-images. In FIGS. 3 and 4, a reference numeral 10 denotes an object, a solid arrow denotes a viewpoint of a captured image, and a dotted arrow denotes a viewpoint of an interpolated image. A direction of the arrow indicates a direction of the viewpoint. FIG. 3 shows cameras are arranged on a circle line 100 such that they surround objects 10 to capture captured images. In this case, viewpoints for interpolated images generated by the interpolating unit 2 are placed between viewpoints of captured images on the same circle line 100. Further, other viewpoints for interpolated images are placed on circle lines 101, which are concentric with the circle line 100 and have smaller radius than the circle line 100. All viewpoints are directed towards the center of the circle lines 100 and 101 as shown in FIG. 3.

FIG. 4 shows cameras are arranged on a straight line 102. In this case, viewpoints of interpolated images generated by the interpolating unit 2 are placed between viewpoints of captured images on the straight line 102. Further, other viewpoints are placed on straight lines 103, which are parallel to the straight line 102 and located on an object side with reference to the straight line 102. As shown in FIG. 4, directions of all viewpoints are the same. The number of viewpoints for interpolated image is decided by a capacity available for the storage unit 1.

As shown in FIGS. 3 and 4, a plurality of viewpoints are set beforehand on curbed lines and/or straight lines in an area, where objects 10 are placed, and the interpolating unit 2 generates interpolated images at the viewpoints. Hereinafter, the straight line or the curbed line, which has viewpoints, is referred to as "layer."

Figure 5:
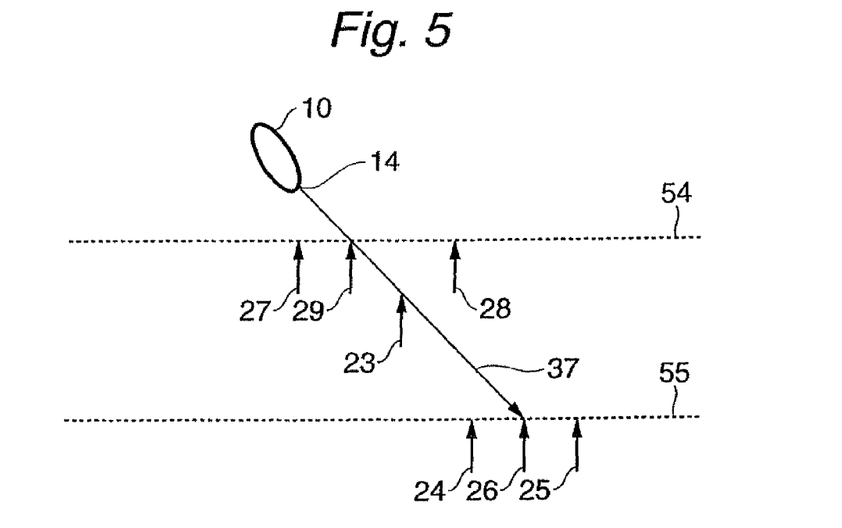
FIGS. 5 and 6 are explanation drawings of an process at an interpolating unit.

If a viewpoint of an interpolated image to be generated is located on the same layer as ones of captured images, the interpolated image can be generated from captured images using a weighting factor corresponding to a distance of viewpoints. It is preferable to use captured images close to the interpolated image to be generated, for example captured images on both sides of the interpolated image. If a viewpoint of an interpolated image to be generated is on a different layer from ones of captured images, the interpolating unit 2 determines a ray passing through the interpolated image, searches a pixel caused or generated by the ray on a pre-image, and determines a pixel value of the interpolated image based on the searched pixel. For example, in FIG. 5, reference numerals 54 and 55 denote layers, reference numerals 24 to 29 denote pre-images, a reference numeral 14 denotes a point on the object 10, a reference numeral 23 denotes an interpolated image to be generated, and a reference numeral 37 denotes a ray from the point 14 passing through the interpolated image 23. Since the ray 37 also passes through pre-images 26 and 29, pre-images 26 and 29 have a pixel caused by the ray 37. Thus, the interpolating unit 2 can determine a pixel value of a pixel, which represents the point 14 on the interpolated image 23, from a pixel caused by the ray 37 in the pre-image 26 or 29. The interpolating unit 2 can find pre-images 26 and 29 by searching cross points of the ray 37 and each layer. If there is no pre-image at any cross point of the ray 37 and each layer, the interpolating unit 2 determines a pixel value caused by the ray 37 from pre-images close to a cross point with the ray 37. For example, the interpolating unit 2 determines the pixel value caused by the ray 37 from the pre-image 24 and/or 25, if there are no pre-images 26 and 29.

Figure 6:
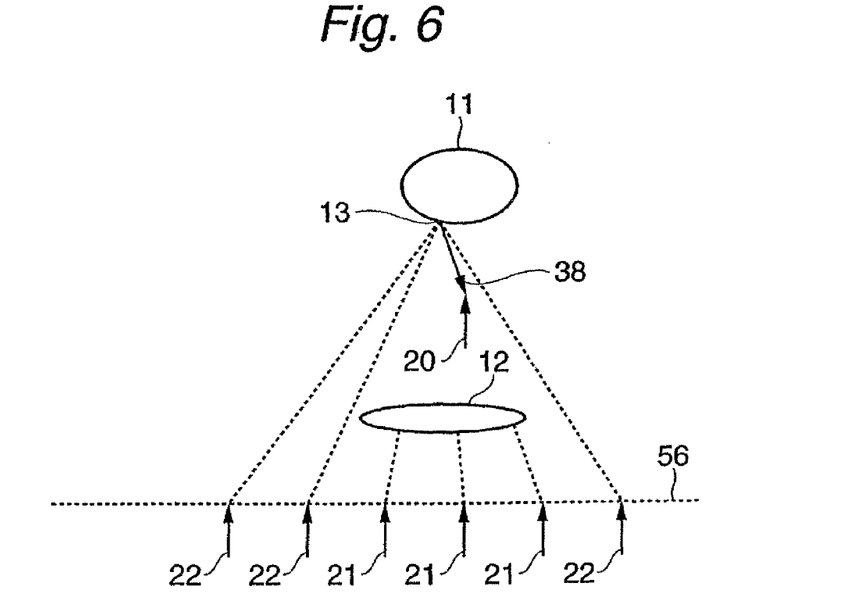

However, a pre-image at a cross point of a ray and a layer does not always have a pixel caused by the ray. In FIG. 6, a reference numeral 56 denotes a layer, reference numerals 11 and 12 denote objects, a reference numeral 13 denotes a point on the object 11, reference numerals 21 and 22 denote pre-images, a reference numeral 20 denotes an interpolated image to be generated, and a reference numeral 38 denotes a ray from the point 13 passing through the interpolated image 20. In this case, the ray 38 is blocked by the object 12. Therefore, a pre-image at the cross point of the ray 38 and the layer 56 has no pixel caused by the ray 38. Further, pre-images 21 have no information about a color of the point 13 due to the object 12. In this case, the interpolating unit 2 need to search pre-images having information about a color of the point 13 for generating the interpolated image 20. To search pre-images having information about a color of the point 13 such as pre-images 22, the interpolating unit 2 uses depth values in a depth map generated by the depth generating unit 3.

The depth map is generated for each pre-image by the depth generating unit 3, and it indicates a distance between the viewpoint and a point on an object represented by each pixel. Thus, if there are n pixels in a pre-image, a depth map of the pre-image has n depth values. The depth generating unit 3 generates depth maps using a well-known art like a stereo matching method, and stores them into the storage unit 1.

Figure 2:
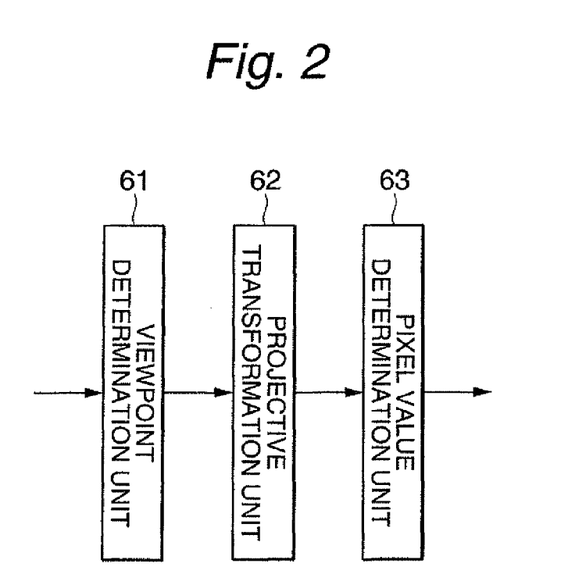
FIG. 2 shows a block diagram of an image generating unit.
Figure 7A:
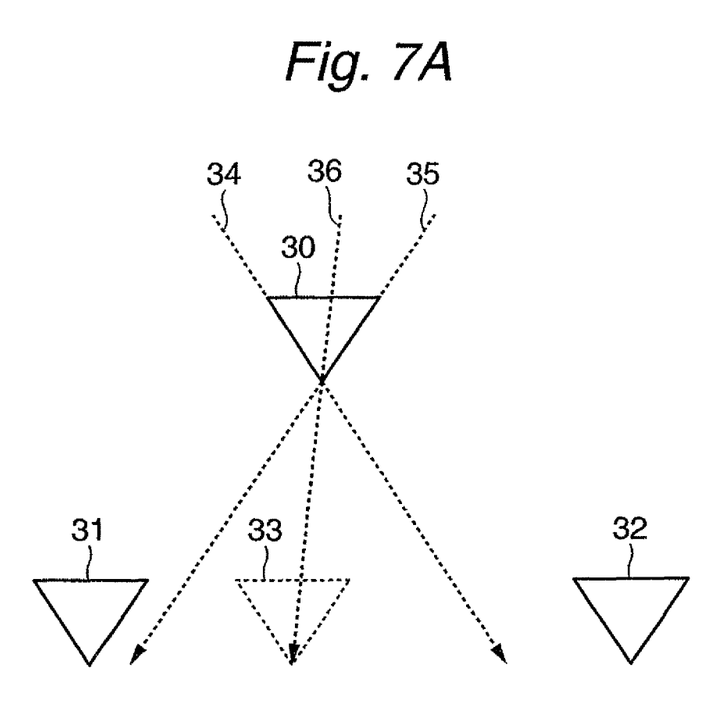
FIGS. 7A, 7B and 8 are explanation drawings of a process at the image generating unit.
Figure 7B:
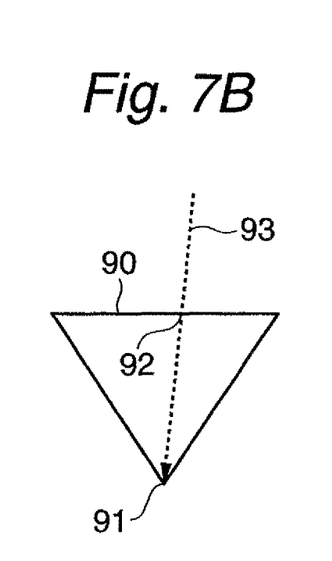

FIG. 2 shows a block diagram of the image generating unit 5. As shown in FIG. 2, the image generating unit 5 includes a viewpoint determination unit 61, a projective transformation unit 62 and a pixel value determination unit 63. FIG. 7A shows a basic process of the image generation from a specified viewpoint performed by the image generating unit 5, and FIG. 7B shows an image representation method used in FIG. 7A. In FIG. 7B, a reference numeral 90 is a plane, not a line. That is, each image is expressed as a square pyramid. In this representation, the plane 90 corresponds to an image plane having a plurality of pixels, a point 91 corresponds to a viewpoint, and a direction of a normal line from the point 91 to the plane 90 corresponds to a direction of the viewpoint. In this case, a pixel value of a pixel 92 on the plane 90 is decided by a ray 93, which passes through the pixel 92 and reaches the point 91.

In FIG. 7A, a reference numeral 30 denotes an image to be generated, and reference numerals 31 and 32 denote pre-images on the closest layer to a viewpoint of the image 30. The image generating unit 5 generates the image 30 by deciding pixel values caused or generated by rays, which passes through the viewpoint of the image 30 and located between rays 34 and 35. For determining a pixel value caused by a ray 36, the viewpoint determination unit 61 searches a cross point of the ray 36 and the closest layer. In case of FIG. 7A, a viewpoint at an image 33 is searched. The image generating unit 5 uses pre-images that are on the closest layer and located on both sides of the cross point to decide a pixel value by the ray 36. In case of FIG. 7A, the image generating unit 5 uses pre-images 31 and 32. To decide the pixel value by the ray 36, the projective transformation unit 62 generates a depth map of the image 33 from a depth map of the pre-image 31 by projective transformation, and determines a depth value of a pixel caused by the ray 36 on the image 33 based on the generated depth map of the image 33. In other word, the projective transformation unit 62 determines the depth value of the pixel cause by the ray 36 on the image 33 based on the viewpoint, visual field and depth values of the pre-image 31 and the viewpoint and visual field of the image 33.

Then, the pixel value determination unit 63 searches corresponding pixels on pre-images 31 and 32, which represent the same point as the pixel caused by the ray 36, based on depth maps of pre-images 31 and 32 as well as a depth value of the pixel caused by the ray 36 on the image 33. More specifically, since the depth value of the pixel caused by the ray 36 on the image 33 indicates an originating point of the ray 36, the pixel value determination unit 63 finds a pixel representing the originating point on pre-images 31 and 32 based on their depth maps. Finally, the pixel value determination unit 63 calculates the pixel value caused by the ray 36 based on pixel values of corresponding pixels on pre-images 31 and 32. In this calculation, a distance between the image 33 and pre-images 31 and 32 are considered. For example, the pixel value caused by the ray 36 is $A*X+(1-A)*Y$, where X is a pixel value of the corresponding pixel on the pre-image 31, Y is a pixel value of the corresponding pixel on the pre-image 32, and A is a ratio of a distance between the pre-image 31 and the image 33 to a distance between the pre-images 31 and 32.

In the above embodiment, pre-images 31 and 32 are used to determine the pixel value caused by the ray 36. However, it is possible to determine the pixel value caused by the ray 36 using the pre-image 31 only. Of course, it is possible to determine the pixel value caused by the ray 36 using the pre-image 32 only.

As described above, pixel values of the image 30 are determined by pre-images on the closest layer and depth maps corresponding to the pre-images. However, pre-images 31 and 32 may not have a corresponding pixel to the pixel caused by the ray 36 due to occlusion. If the pre-image 31 has no corresponding pixel to the pixel caused by the ray 36, it is not possible to obtain a depth value for the pixel caused by the ray 36 on the image 33. In this case, it is not possible to determine a pixel value caused by the ray 36 from the pre-image 31.

More specifically, to determine a pixel value caused by the ray 36 based on pre-images 31 and 32, the depth value of the pixel caused by the ray 36 on the image 33 must be obtained from depth maps of the pre-images 31 and 32. To determine a pixel value caused by the ray 36 based on the pre-image 31, the depth value of the pixel caused by the ray 36 on the image 33 must be obtained from the depth map of the pre-image 31.

If the depth value of a pixel caused by the ray 36 cannot be obtained from depth maps of the pre-image 31 and/or 32 on the closest layer, the image generating unit 5 determines the pixel value by the ray 36 using pre-images and their depth maps on other layers.

Figure 8:
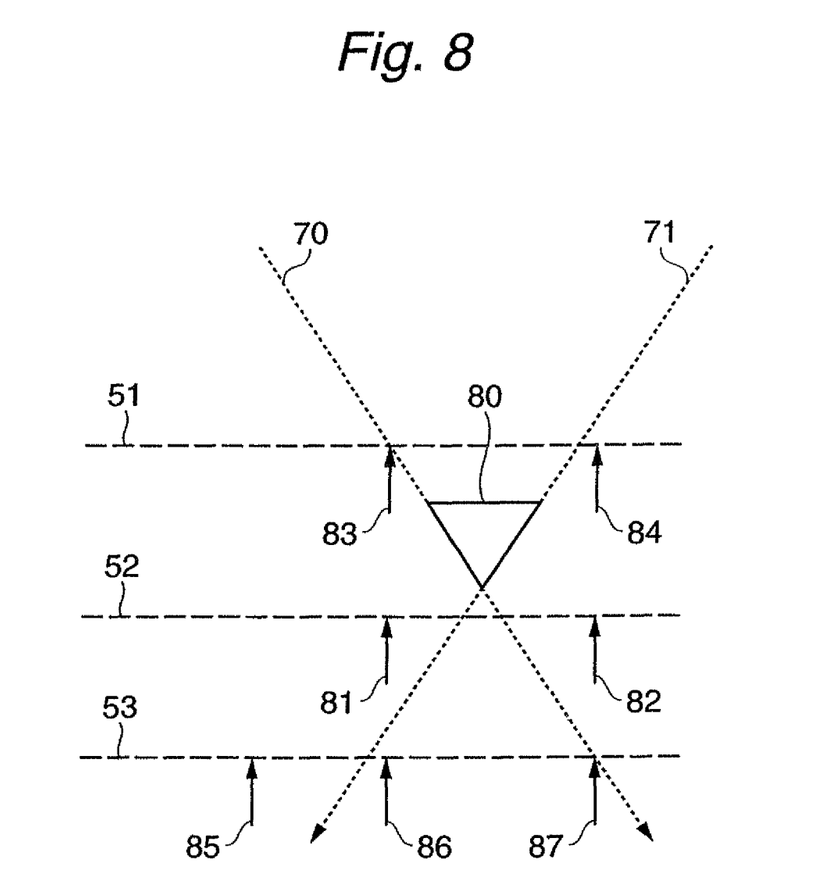

FIG. 8 is an explanation drawing of the image generation by the image generating unit 5, in case a pixel value can not be determined by pre-images on the closest layer. Firstly, the image generating unit 5 determines each pixel value of an image 80 by a pre-image 81 and/or a pre-image 82 on the closest layer 52 to the image 80 using a process described above. If all pixel values cannot be determined by the pre-image 81 and/or the pre-image 82 on the layer 52, the pixel value determination unit 63 determines the undetermined pixel values using a pre-image 83 and/or a pre-image 84 on the second closest layer 51 using a process described above. More specifically, the viewpoint determination unit 61 determines a cross point of the second closest layer 51 and a ray passing through the viewpoint of the image 80, the projective transformation unit 62 searches a pre-image on either side of the cross point and calculates depth values of a pixel caused by the ray from a depth map of the pre-image, and the pixel value determination unit 63 calculates the pixel value caused by the ray from pre-images on both or either side of the cross point. If all pixel values cannot be determined by the pre-image 83 and/or the pre-image 84 on the layer 51, the pixel value determination unit 63 determines the undetermined pixel values using pre-images 85, 86 and/or 87 on the third closest layer 53. If all pixel values cannot be determined using pre-images on all layers, the pixel value determination unit 63 determines the undetermined pixel values by interpolation using already determined pixel values around the undetermined pixels on the same image 80.

In another embodiment, the image generating unit 5 determines an image from a specified viewpoint by averaging a plurality of images, each of which is generated by a pre-image. For example, the image generating unit 5 generates seven images from a viewpoint of the image 80 using pre-images 81 to 87, respectively. That is, the first image is generated from the pre-image 81 using a process described above, the second image is generated from the pre-image 82 using a process described above, and the seventh image is generated from the pre-image 87 using a process described above. Then, the pixel value determination unit 63 calculates an average value for each pixel of seven images, and generates the image 80 having pixel values equal to average values. Here, undetermined pixel values from pre-images 81 to 87 due to occlusion are excluded from averaging process. It is noted, in FIG. 8, the fifth image generated from the pre-image 85 is used to determine pixel values caused by rays between the pre-images 85 and 86, and other pixel values in the fifth image are excluded from the averaging process. Similarly, the seventh image generated from the pre-image 87 is used to determine pixel values caused by rays between the pre-images 86 and 87, and other pixel values are excluded from the averaging process.

To realize a free viewpoint video system, cameras are arranged in the first area towards the second area, where one or more objects are placed, and each camera captures objects. Normally, the number of cameras to be used is limited. Thus, an image from a viewpoint, where no camera is placed, should be generated from captured images by using interpolation techniques. However, it is not realistic to generate images from all possible viewpoints in advance, due to a limitation of a capacity of the storage unit 1 and processing load. In other words, it is not realistic to generate data for all rays in a ray-space in advance. Therefore, a depth map is generated for each pre-image, and a pixel in an image from an arbitrary viewpoint is generated by determining corresponding pixels on pre-images using depth maps of the pre-images. A decision of a pixel value using the depth map is easy, and it is possible to reduce data stored in the storage unit 1.

However, if pre-images are prepared only in the first area, it takes a long time to generate an image from a viewpoint, which is occluded from the first area. For example, pre-images 21 have no corresponding pixel to a pixel caused by the ray 38 in FIG. 6. In this case, to generate the image 20, the image generating unit 5 needs to search pre-images having pixels corresponding to the pixel caused by the ray 38. Since this operation takes a long time, the invention set several lines in the second area, and prepares pre-images and their depth maps on these lines in the second area. With this configuration, images from any viewpoint can be generated quickly, and data in the storage unit 1 can be reduced.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program, which realizes the functions of the above embodiments on a computer system. Programs defining functions on the invention can be delivered to a computer system using computer readable storage media or via network. It should be understood the invention might be implemented by software, hardware or a combination of software and hardware.

The invention claimed is:

1. An image generating apparatus, comprising:
   predetermined lines comprising a line on which cameras are arranged and lines on which cameras are not arranged;
   an interpolating unit configured to generate a plurality of interpolated images on the predetermined lines from images captured by the cameras;
   a depth generating unit configured to generate a depth map which indicates a depth value, which is a distance between a viewpoint and a point on an object represented by each pixel of a plurality of pre-images on the predetermined lines, the pre-images comprising the images captured by the cameras and the interpolated images;
   a storage unit configured to store the pre-images from viewpoints on the predetermined lines and depth maps indicating the depth value of each pixel of a corresponding pre-image;
   an image generating unit configured to generate a first image from a first viewpoint based on the pre-images and depth maps, wherein:
   the image generating unit includes a viewpoint determination unit configured to select a closest line to a viewpoint of an image to be generated and configured to determine a second viewpoint of a second image on the closest line in order to generate the image of the viewpoint to be generated, the second image having a second pixel caused by the same ray as a first pixel of the first image,
   when an object is disposed between the first viewpoint and the second viewpoint such that the second viewpoint does not have all the pixel data necessary to generate the first image of the first viewpoint, the interpolating unit is configured to search for pre-images associated with one or more additional viewpoints to provide the pixel data to a pixel value determination unit, and the pre-images are searched using the depth values from the depth map, and
   when the pixel data cannot be determined using the pre-images and associated depth maps, the pixel value determination unit determines the pixel data by interpolating already determined pixel values around the undetermined pixel data in the first image.

2. The image generating apparatus according to claim 1, wherein the image generating unit comprises:
   a projective transformation unit configured to select a third image from pre-images on the closest line, and configured to calculate a depth value of the second pixel from a depth map of the third image, and
   the pixel value determination unit configured to determine a third pixel of the third image corresponding to the second pixel based on the depth value of the second pixel and the depth map of the third image, and configured to determine a pixel value of the first pixel based on a pixel value of the third pixel.

3. The image generating apparatus according to claim 2, wherein the projective transformation unit selects a fourth image from pre-images on the closest line, a viewpoint of the fourth image being located on an opposite side of a viewpoint of the third image with reference to the second viewpoint, and the pixel value determination unit determines a fourth pixel of the fourth image corresponding to the second pixel based on the depth value of the second pixel and a depth map of the fourth image, and uses a pixel value of the fourth pixel to determine the pixel value of the first pixel.

4. The image generating apparatus according to claim 2, wherein the image generating unit determines the pixel value of the first pixel using a pre-image on a line other than the closest line when the depth value of the second pixel can not be obtained from the depth map of the third image.

5. The image generating apparatus according to claim 3, wherein the image generating unit obtains the depth value of the second pixel from the depth map of the fourth image when the depth value of the second pixel can not be obtained from the depth map of the third image, and determines the pixel value of the first pixel using a pre-image on a line other than the closest line when the depth value of the second pixel can not be obtained from the depth map of the fourth image.

6. The image generating apparatus according to claim 1, wherein the image generating unit comprises:
   a projective transformation unit configured to select third images from pre-images, and configured to calculate a depth value of each second pixel from depth maps of the third images, each third viewpoint of the third images being located next to each second viewpoint on the same line; and
   the pixel value determination unit configured to determine a third pixel of each third image corresponding to each second pixel based on the depth value of each second pixel and depth maps of the third images, and configured to determine a pixel value of the first pixel from pixel values of the determined third pixels.

7. A non-transitory computer readable medium storing a computer program to cause a computer to operate as the apparatus according to claim 1.

8. The image generating apparatus according to claim 1, wherein the predetermined lines are arranged in concentric circles that surround at least one object.

9. The image generating apparatus according to claim 1, wherein the predetermined lines are arranged in parallel lines where at least two lines each have at least two pre-images such that the parallel lines are disposed on a side of at least one object.

10. The image generating apparatus according to claim 1, wherein the predetermined lines are arranged either: (1) in concentric circles, or (2) in parallel lines where at least two lines each have at least two pre-images.

* * * * *